United States Patent
Ninomiya et al.

(10) Patent No.: US 6,963,623 B2
(45) Date of Patent: Nov. 8, 2005

(54) MULTI-SYSTEM CORRESPONDENCE RECEIVER

(75) Inventors: Kunio Ninomiya, Niihama (JP); Takami Uemura, Niihama (JP); Hiroyuki Satoh, Saijo (JP)

(73) Assignee: Matsushita Electric Industrial Co., Ltd. (JP)

( * ) Notice: Subject to any disclaimer, the term of this patent is extended or adjusted under 35 U.S.C. 154(b) by 841 days.

(21) Appl. No.: 09/820,335

(22) Filed: Mar. 29, 2001

(65) Prior Publication Data

US 2001/0033625 A1 Oct. 25, 2001

(30) Foreign Application Priority Data

Mar. 30, 2000 (JP) ........................................ 2000-095335

(51) Int. Cl.⁷ ........................... H04B 17/00; H04B 3/46; H04Q 1/20
(52) U.S. Cl. ........................ 375/326; 375/328; 375/316; 348/729; 348/725
(58) Field of Search ................................. 375/316, 320, 375/340, 324–328; 348/729, 728, 725, 731, 735, 554, 555, 558; 455/150.1, 180.3

(56) References Cited

U.S. PATENT DOCUMENTS

| | | | |
|---|---|---|---|
| 5,598,221 A | | 1/1997 | Miyahara et al. ............ 348/554 |
| 5,982,457 A | * | 11/1999 | Limberg ...................... 348/725 |
| 6,046,781 A | * | 4/2000 | LeRoy ......................... 348/731 |
| 6,104,763 A | | 8/2000 | Limberg ...................... 375/324 |
| 6,108,044 A | * | 8/2000 | Shin ............................ 348/555 |
| 6,111,613 A | * | 8/2000 | Sasano et al. ............... 348/468 |
| 6,307,598 B1 | * | 10/2001 | Limberg ...................... 348/729 |
| 6,335,762 B1 | * | 1/2002 | Lee ............................. 348/558 |
| 6,353,463 B1 | * | 3/2002 | Seo ............................. 348/731 |
| 6,483,553 B1 | * | 11/2002 | Jung ........................... 348/731 |
| 6,519,298 B1 | * | 2/2003 | Kim ............................ 375/343 |
| 6,757,025 B1 | * | 6/2004 | Takano et al. .............. 348/554 |

FOREIGN PATENT DOCUMENTS

| | | |
|---|---|---|
| JP | 05-347736 | 12/1993 |
| JP | 06-13928 | 1/1994 |
| JP | 7-7678 | 1/1995 |
| JP | 7-212800 | 8/1995 |
| JP | 10-502235 | 2/1998 |
| JP | 11-331301 | 11/1999 |
| WO | WO 96/01021 | 1/1996 |

\* cited by examiner

Primary Examiner—Phuong Phu
(74) Attorney, Agent, or Firm—Parkhurst & Wendel, L.L.P.

(57) ABSTRACT

A carrier wave NTSC component or a VSB pilot signal in an IF signal is extracted and judged. Then, on the basis of the judgment result, either of demodulation circuit 13 and 14, which is appropriate for the received broadcast wave is switched. Information of co-broadcasting programs for analog and digital broadcasts are acquired from EPG and memorized. In case of high-speed channel search, analog broadcast is preferentially switched to. In case of co-broadcasting, the analog broadcast program is displayed on the screen at the beginning, and then, the digital broadcast program is switched when the data decoding is completed. Therefore, it is possible to provide a receiver for receiving digital and analog broadcasts, which can perform switching automatically to a demodulation circuit appropriate for the channel selected modulated wave, and which can also seamlessly switch the channels between analog and digital broadcasts, thereby screen display can be switched smoothly at switching from analog broadcast to digital broadcast.

3 Claims, 12 Drawing Sheets

MULTI-SYSTEM CORRESPONDENCE RECEIVER

FIELD OF THE INVENTION

The present invention relates to a multi-system corresponding receiver and, more particularly, to that which can receive automatically discriminating the broadcasting system when it receive the modulation wave including the digital terrestrial broadcasting which transmits the video and audio information with coding and digital modulating the same, the digital cable broadcasting, and the NTSC analogue broadcasting mixed, and which can further perform switching of the screen smoothly without any different feelings when conducting seamless selection of the digital broadcasting and the analogue broadcasting.

BACKGROUND OF THE INVENTION

In recent years, regarding to television broadcast, digital ground wave broadcast service and digital CATV broadcast service have been provided with the advances of digital compression technique and digital modulation/demodulation technique. In these broadcast services, video data is coded by MPEG2 coding system, and the digital modulation system is employed for the transmission of the coded bit stream. Particularly, 8VSB modulation system is employed for the terrestrial broadcasting in North America, and QAM system is employed in digital CATV system, respectively, being co-used with conventional NTSC analog broadcasting.

An example of conventional multi-system corresponding receiver which can correspond to the digital broadcasting and the analogue broadcasting will be described with reference to the drawings.

FIG. 9 is a block diagram of a conventional multi-system corresponding receiver which can correspond to ground wave broadcasting, NTSC analogue broadcasting, and digital cable broadcasting.

A construction of a portion corresponding to the digital ground wave broadcasting receiver will be first described.

In this receiver, there are provided a tuner 91 for selecting a channel of RF modulated-wave signal which is input from a terminal 90; a SAW (Surface Acoustic Wave) filter 92 for applying a band limitation to the selected modulated-wave signal; an AMP 93 for amplifying a modulated-wave signal; an orthogonal detector circuit 94 for detecting the modulated wave using a mixer; a low pass filter (LPF) 95 for cutting high frequency components of the detected signal; a digital VSB demodulation circuit 96 for performing 8VSB demodulation; and a digital decoding and video processing circuit 97 for MPEG decoding and video signal processing.

The operation of the digital ground wave broadcasting 8VSB receiver constituted as above will now be explained. The modulated wave tuned by the tuner 91 is output as an IF signal to the SAW filter 92. After being limited to a specified frequency characteristic by the SAW filter 92, the demodulated wave is amplified by the AMP 93 and is input to the orthogonal detector circuit 94.

FIG. 10 shows an 8VSB digital modulated wave which is represented in a frequency region. As shown in FIG. 10, the 8VSB digital modulated wave is transmitted at a frequency band width of 6 MHz which is the same as that in analog NTSC broadcasting, and a pilot signal fp is added.

Accordingly, the synchronous wave-detection with frequency synchronization and phase synchronization is performed to the pilot signal to be converted into the 8VSB base band signal. The 8VSB signal dropped into the base band signal is cut for its high frequency signals by the LPF 95 to be outputted to the VSB demodulation circuit 96, decoded by the demodulation circuit 96, and converted into the transport data. The transport data is MPEG decoded and video signal processed by the digital decoding and video processing circuit 97 to become an analogue video signal to be outputted to a terminal 121, and displayed on such as a monitor via the switch 122 and the video signal output terminal 124.

Meanwhile, the structure corresponding to the analogue broadcasting receiver includes a tuner 98 for channel selecting an input RF analog modulated signal; an AMP 99 for amplifying the selected modulated signal; a Nyquist filter 100 having a symmetric slope characteristic against the carrier frequency; an orthogonal detector circuit 111 for performing synchronous detection of the carrier wave; a LPF 112 for applying band limitation to the detected signal; and an analog video signal processing part 113.

The operation of the analogue NTSC broadcasting receiver will now be described. An analog RF modulated wave which is input to the tuner 98 is channel selected similarly as the 8VSB digital broadcasting wave, and is output as an IF signal. The IF signal outputted is amplified by the AMP 99 and is band limited by the Nyquist filter 100. The modulated signal which is output from the Nyquist filter 100 is then outputted to the orthogonal detector circuit 111. The orthogonal detector circuit 111 performs orthogonal detection for the carrier wave included in the modulated wave which is subjected to the band limitation with performing frequency locking and phase locking thereto, and outputs the result as a video signal to the LPF 112. Subsequently, the video signal having passed through the LPF 112 is output to the analog video processing circuit 113 to be processed thereby, and then displayed on a monitor or the like via the switch 122 and terminal 124.

The structure corresponding to the digital broadcasting receiver includes a tuner 114 for channel selecting a channel; a SAW filter 115 for applying a band limitation to the QAM modulated wave; an AMP 116 for amplifying the QAM modulated wave; a frequency converter 117 for converting the frequency of the QAM modulated wave; a LPF 118 for cutting the high frequency components of the frequency converted signal; a digital QAM demodulation circuit 119 for performing QAM demodulation processing; and a digital decoding and video processing circuit 120 for performing decoding and video processing to MPEG data.

The operation of the digital cable broadcasting receiver which performs the transmission by the QAM digital modulation will be described. Also in the case of QAM digital cable broadcasting, similarly as in the digital 8VSB broadcasting and the NTSC analogue broadcasting, the inputted RF signal is channel selected by the digital broadcasting tuner 114 and is outputted as an IF signal. Then, the signal is subjected to the frequency limitation which is required for the IF signal by the SAW filter 115, and is outputted to the AMP 116. The IF signal is then amplified by the AMP 116 and is outputted to the frequency converter 117. The QAM modulated signal, which is frequency converted to a further lower band than the IF band, is outputted, after the high frequency components thereof are cut by the LPF 118, to the digital QAM demodulation circuit 119 to be decoded thereby, and then is outputted as transport data to the next stage digital decoding and video processing circuit 120. The digital decoding and video processing circuit 120 performs MPEG decoding and video processing to the transport data to result an analogue, and this analogue signal is outputted through the switch 122 and terminal 124 to a monitor or the like to be displayed on a screen.

Heretofore, as the ground wave broadcasting, there has been provided analogue broadcasting such as NTSC. However, by the development of the digital transmission technology in recent years as described above, the digital ground wave broadcasting employing the digital modulation (particularly, 8VSB digital modulation in North America) has started. Also in the field of cable television, digital cable broadcasting service has started employing the conventional digital QAM modulation.

In the conventional constitution of multi-system corresponding receiver which can correspond to various transmission systems, the respective receivers have independent constitutions for the respective modulations systems, and even when considering a case where the ground wave broadcasting is received, it is necessary to switch between the receiver for receiving the analog broadcasting such as NTSC and the receiver for receiving the BVSB digital broadcasting. In addition, it is also necessary to switch the receiver for the digital cable broadcasting with the NTSC analog broadcasting or the digital ground wave broadcasting. It is very troublesome for the receiver's user to switch the receiver to that corresponding to the respective system at each time.

Further, in a system where the broadcasting of respective systems are seamlessly tuned by the same MPU, it takes a time for digital decoding processing and for decoding of data in the digital broadcasting, and there is a large difference in the time from the channel tuning to the video image being displayed on such as a monitor, as compared with at receiving the analog broadcasting. Accordingly, when the analog broadcast program and the digital broadcast program are seamlessly channel tuned, screen changes require a long period of time for the receiver's user in such as a case where a high speed channel up down operation is performed, thereby resulting a large inconvenience.

SUMMARY OF THE INVENTION

It is an object of the present invention to provide a multi-system corresponding receiver which can, when receiving the broadcasting wave including mixed 8VSB digital broadcasting and NTSC analog broadcasting, automatically judge the channel selected modulation wave to automatically switch to an appropriate demodulator circuit which is suited for the broadcasting and which is very comfortable for the user.

It is a further object of the present invention to provide a multi-system corresponding receiver which can, in the digital cable broadcasting including mixed digital QAM modulation wave and the digital 8VSB modulation wave, automatically judge the channel selected modulation wave thereby to automatically switch to an appropriate demodulator circuit suited for the broadcasting and which is very comfortable for the user.

It is a still further object of the present invention to provide a multi-system corresponding receiver which can, when the respective digital broadcasting and the analog broadcasting are seamlessly channel selected by a construction of plural tuners, can perform screen changing smoothly without any uncomfortable feeling, even when the high speed channel up and down operation in the mixed analog broadcasting and digital broadcasting is performed or the channel is switched from analog broadcast channel to the digital broadcast channel.

Other objects and advantages of the present invention will become apparent from the detailed description and specific embodiments described are provided only for illustration since various additions and modifications within the spirit and scope of the invention will be apparent to those skilled in the art from the detailed description.

According to a first aspect of the present invention, there is provided a multi-system correspondence receiver for the terrestrial broadcasting including mixed digital modulated wave broadcasting for transmitting in packets coded digital video and audio data and NTSC analog modulated wave broadcasting, comprising: an intermediate frequency converting means for selecting the channel of the broadcast wave and converting the selected high frequency signal into an IF signal having a center frequency of 44 MHz; a modulated wave converting means for, when the intermediate frequency signal is applied, converting digital and analog modulated waves into base-band signals, respectively; a carrier wave component extracting means for extracting a carrier wave component of an analog NTSC modulated wave from the IF signal; and a modulated wave discrimination means for judging whether the received signal is the analogue modulation wave or the digital modulation wave from the extracted carrier wave component.

Therefore, it is possible to provide a multi-system corresponding receiver, which, even when receiving any of analog broadcast and digital broadcast, can switch automatically to a demodulation circuit that is appropriate for the received broadcast, and therefore, which is quite user friendly.

According to a second aspect of the present invention, there is provided a multi-system correspondence receiver according to the first aspect, which further comprises: a frequency conversion means for converting the selected IF signal into a further lower band; and a carrier wave component detecting means for detecting a carrier wave component of the analog modulation wave signal in the modulated wave signals which are frequency converted into the further lower band.

Therefore, it is possible to provide a multi-system corresponding receiver, which, even when receiving any of analog broadcast and digital broadcast, can switch automatically to a demodulation circuit that is appropriate for the received broadcast, and therefore, which is quite user friendly.

According to a third aspect of the present invention, there is provided a multi-system correspondence receiver according to the first aspect, which further comprises: an analogue NTSC modulation wave demodulator circuit for demodulating the analogue NTSC modulated wave; a digital modulation wave demodulation circuit for demodulating the digital demodulated wave; and the demodulation signal processing circuit being switched dependent on the judgment result of whether the extracted carrier component is the analogue modulation wave or the digital modulation wave.

Therefore, it is possible to provide a multi-system corresponding receiver, which, even when receiving any of analog broadcast and digital broadcast, can switch automatically to a demodulation circuit that is appropriate for the received broadcast, and therefore, which is quite user friendly According to a fourth aspect of the present invention, there is provided a multi-system correspondence receiver for the digital cable broadcasting which makes packets the coded digital image data and audio data, and performs the transmission by QAM modulation, which further includes: a selecting means for selecting a channel of the both digital broadcasting and converting the selected high frequency signal to an IF signal; a modulating wave conversion means for converting the digital QAM modulation wave and the multi-value digital VSB modulation wave in the IF signal into the base band signals, respectively; a pilot wave component extracting means for extracting the pilot signal component of the multi-value VSB modulation signal from the IF signal; and a digital modulation judging means for judging whether the received signal is the QAM modulation wave or the multi-value VSB digital modulation wave from the extracted pilot signal component.

Therefore, it is possible to provide a multi-system corresponding receiver, which can automatically judge whether the channel selected modulation wave is QAM modulation wave or multi-value VSB digital modulation wave, and automatically switch to a demodulation circuit that is appropriate for the received broadcast, and thereby being quite user friendly.

According to a fifth aspect of the present invention, there is provided a multi-system correspondence receiver according to the fourth aspect, which further comprises: a frequency conversion means for frequency converting the selected IF signal into a further lower band; a pilot wave component detecting means for detecting the pilot wave component of the digital multi-value VSB modulated wave signal which is frequency converted into a further lower band from the IF signal.

Therefore, it is possible to provide a multi-system corresponding receiver, which can automatically judge whether the channel selected modulation wave is QAM modulation wave or multi-value VSB digital modulation wave, and automatically switch to a demodulation circuit that is appropriate for the received broadcast, and thereby being quite user friendly.

According to a sixth aspect of the present invention, there is provided a multi-system correspondence receiver according to the fourth aspect, which further comprises: a digital QAM modulated wave demodulation circuit for demodulating the digital QAM modulated wave; a digital multi-value VSB modulated wave demodulation circuit for demodulating the digital QAM demodulated wave; and switching between the QAM demodulated signal processing circuit and the VSB demodulation signal processing circuit on the basis of the judgment result of whether the extracted pilot signal is the QAM modulated wave or the multi-value VSB modulated signal.

Therefore, it is possible to provide a multi-system corresponding receiver, which can automatically judge the channel selected modulation wave, and automatically switch to a demodulation circuit that is appropriate for the received broadcast, and which is therefore quite user friendly.

According to a seventh aspect of the present invention, there is provided a multi-system corresponding receiver which includes a tuner for digital broadcasting and a tuner for receiving analogue broadcasting and perform receiving by controlling the decoding processing sections for the digital broadcasting and for the analogue broadcasting by the same micro processing unit, and which comprises: a same program time table for the analogue broadcasting and the digital broadcasting is extracted from the electronic program guide to be memorized; and a high speed channel up down operation of a constant time is performed and when there is the analogue broadcasting at the same time at the reception of the digital broadcasting, the analogue broadcasting is received with priority.

Therefore, it is possible to provide a multi-system corresponding receiver, which, even when the analog broadcast program and the digital broadcast program are channel changed at a high speed, can change the screen at a high speed, and can show the contents of the programs to the users without giving any uncomfortable feelings to the users.

According to an eighth aspect of the present invention, there is provided a multi-system corresponding receiver according to the seventh aspect, in which the switching to the analogue broadcasting at the high speed channel up down operation during a constant time is carried out by judging the presence of the digital analogue simultaneous broadcasting using the EPG information for the video signal after being subjected to the analogue video processing.

Therefore, it is possible to provide a multi-system corresponding receiver, which, even when the analog broadcast program and the digital broadcast program are channel changed at a high speed, can change the screen at a high speed, and can show the contents of the programs to the users without giving any uncomfortable feelings to the users.

According to a ninth aspect of the present invention, there is provided a multi-system corresponding receiver according to the seventh aspect, in which the digital broadcasting and the analogue broadcasting are selected seamlessly without distinction between the analogue broadcasting and the digital broadcasting by a same tuner.

Therefore, it is possible to provide a multi-system corresponding receiver, which, even when the analog broadcast program and the digital broadcast program are channel changed at a high speed, can change the screen at a high speed, and can show the contents of the programs to the users without giving any uncomfortable feelings to the users.

According to a tenth aspect of the present invention, there is provided a multi-system corresponding receiver which includes a tuner for digital broadcasting and a tuner for analogue broadcasting and perform receiving by controlling the both decoding processing section by a same micro processing unit wherein a same time program time table of the analogue broadcasting and the digital broadcasting is extracted from the digital broadcasting EPG information to be memorized, and when the same time broadcasting is present even at a time when the analogue broadcasting being selected, the digital broadcasting is selected with priority to be displayed.

Therefore, when there are analog and digital simultaneous broadcasting, the digital broadcasting which has better image quality is automatically selected to be displayed.

According to an eleventh aspect of the present invention, there is provided a multi-system corresponding receiver according to the tenth aspect, in which switching to the digital broadcasting at the selection of the analogue broadcasting being selected, is performed by judging the presence of the same time broadcasting using the EPG information for the signal after the digital signal is subjected to digital decoding and MPEG decoding.

Therefore, when there are analog and digital simultaneous broadcasting, the digital broadcasting which has better image quality is automatically selected to be displayed.

According to a twelfth aspect of the present invention, there is provided a multi-system corresponding receiver according to the tenth aspect, in which the digital broadcasting and the analogue broadcasting are selected seamlessly without distinction between analogue broadcasting and digital broadcasting by a same tuner.

Therefore, when there are analog and digital simultaneous broadcasting, the digital broadcasting which has better image quality is automatically selected to be displayed.

According to a thirteenth aspect of the present invention, there is provided a multi-system corresponding receiver which includes a tuner for digital broadcasting and a tuner for analogue broadcasting and perform receiving by controlling the both decoding processing sections by a same micro processing unit, wherein a same time program time table for the analogue broadcasting and the digital broadcasting is extracted from the EPG information of the digital broadcasting and the seamless channel selection is performed, for the digital broadcasting channel program which has the analogue same time broadcasting during when the digital broadcasting is selected, the analogue broadcasting program is tuned to be outputted at the beginning and at the when the data decoding of the digital broadcasting program is concluded, it is switched to the digital broadcasting program instantaneously.

Therefore, it is possible to provide a multi-system corresponding receiver which, even when the switching is performed from the analog broadcasting to the digital broadcasting, the screen change can be performed smoothly without uncomfortable feeling.

According to a fourteenth aspect of the present invention, there is provided a multi-system corresponding receiver according to the thirteenth aspect, in which the switching from the analogue broadcasting to the digital broadcasting is performed by detecting the presentation time stamp in the data stream, in the signal for judging that the video data decoding of the digital broadcasting program is concluded.

Therefore, it is possible to provide a multi-system corresponding receiver which, even when the switching is performed from the analog broadcasting to the digital broadcasting, the screen change can be performed smoothly without uncomfortable feeling.

According to the fifteenth aspect of the present invention, there is provided a multi-system corresponding receiver according to the thirteenth aspect, in which, when the analogue broadcasting and the digital broadcasting of the same content are present in the same time band, the programs are selected by tuners corresponding to the respective broadcasting systems, and the analogue video signal processing and the digital video signal processing are carried out concurrently.

Therefore, it is possible to provide a multi-system corresponding receiver which, even when the switching is performed from the analog broadcasting to the digital broadcasting, the screen change can be performed smoothly without uncomfortable feeling.

DETAILED DESCRIPTION OF THE PREFERRED EMBODIMENTS (Embodiment 1)

A first embodiment of the present invention will now be described with reference to FIG. 1.

Figure 1:
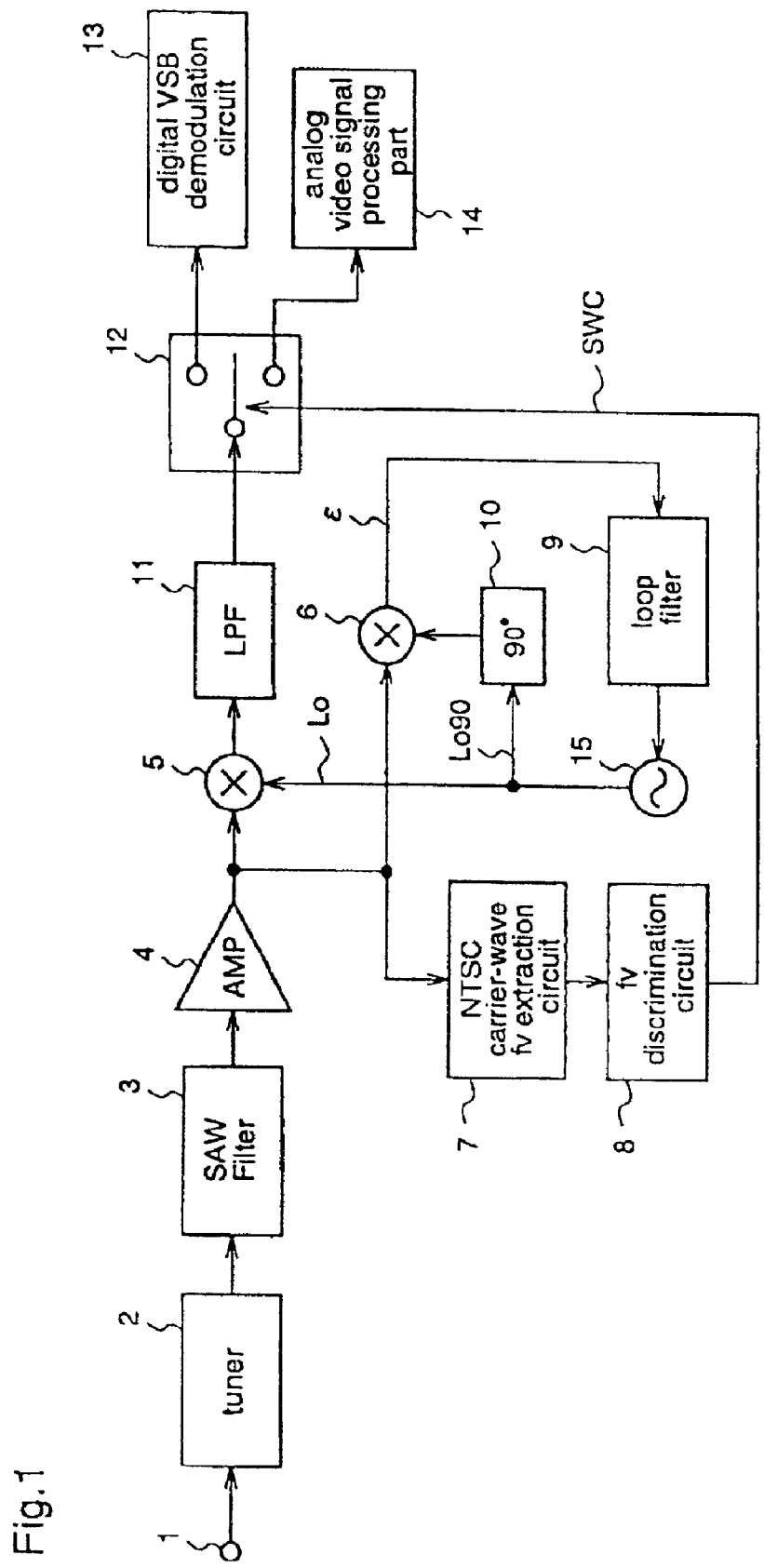
FIG. 1 is a block diagram illustrating the multi-modulation receiver as the first embodiment of the present invention.

FIG. 1 is a block diagram showing a multi-system corresponding receiver corresponding to both of digital ground wave broadcast and NTSC analog broadcast.

In this multi-system corresponding receiver, there are provided a terminal 1 to which a RF modulation wave is input; a tuner 2 for selecting the channel of received modulation wave; a SAW filter 3 for applying a frequency band limitation to an IF signal at the tuner 2; an AMP 4 for amplifying the IF signal which is output from the SAW filter 3; mixers 5 and 6 for orthogonal wave detecting; a LPF 11 for applying a frequency band limitation to the output signal from the mixer 5; a digital VSB demodulation circuit 13 for performing digital VSB demodulation; an analog video processing circuit 14 for performing analog video processing; a loop filter 9 for applying a frequency band limitation to the output signal from the mixer 6; a VCO 15 for oscillating a frequency-controlled signal in accordance with a control signal from the loop filter 9; a 90° phase shifter for shifting the phase of the output signal by 90°; a NTSC carrier wave fv extraction circuit 7 for extracting a carrier wave component fv of an analog NTSC signal from the IF signal; a fv judging circuit 8 for judging whether or not a fv component was detected; and a switch 12 for switching the destination of output signal from the LPF 11 either to a VSB digital demodulation circuit 13 or to an analog video processing circuit 14 in accordance with a control signal from the fv judging circuit 8.

A description is given of an operation of the multi-system corresponding receiver which can correspond to analog and digital broadcasting, which is constructed as described above.

A modulation wave input from the terminal 1 is channel selected by the tuner 2 and output as an IF signal. The IF signal has, in North America, the center frequency of 44 MHz and the channel band width of 6 MHz. The tuner 2 outputs the IF signal having a channel band width of 6 MHz and a center frequency of 44 MHz, for both digital 8VSB ground wave broadcast and NTSC analog ground wave broadcast. The input IF signal from the tuner 2 is subjected to a specified frequency band limitation by the SAW filter 3, and then is output to the AMP 4. The AMP 4 amplifies the IF signal to a specified amplification level, and outputs the same to the mixers 5 and 6. At the mixer 5, a local signal Lo having a frequency equal to that of the carrier wave component is supplied from the VCO 15, the IF signal and local signal are multiplied with together to carry out wave detection, and thus-obtained signal is output as a base-band signal. Meanwhile, a local 90° signal that is obtained by shifting by 90° the local signal Lo output from the VCO 15 by the phase shifter 10 (hereinafter simply referred to as "Lo 90") is supplied to the mixer 6, thereby carrying out wave detection by multiplying the IF signal and Lo 90 together.

Since there exist no orthogonal components in the base-band signal of NTSC analog broadcast and digital 8VSB broadcast, frequency error ε of a carrier wave component in the IF signal is output as the multiplication output of the IF signal and Lo 90 from the mixer 6. The output frequency error ε from the mixer 6 is subjected to frequency band limitation by the loop filter 9, and then output as a frequency control signal to the VCO 15. Accordingly, a PLL (Phase Locked Loop) is constituted by a closed loop of VCO 15; local Lo 9 signal; frequency error ε of a carried wave in the IF signal; and the loop filter 9, thereby synchronous wave detection is performed.

The output base-band signal from the mixer 5 is output to the LPF 11 for cutting high frequency components supplied to the switch 12 switched by a switching control signal SWC and output to an appropriate circuit for signal processing of analog/digital modulated wave. Thus, in accordance with the type of selected modulation wave, the switch 12 makes the base-band signal from the LPF 11 outputted to the digital VSB demodulation circuit 13 in case of digital 8VSB, and outputted to the analog video processing circuit 14 in case of NTSC.

The switching control signal SWC is generated by the following steps. The output IF signal from the AMP 4 is output to the NTSC carrier wave fv extraction circuit 7, a carrier wave fv component of NTSC modulated wave is extracted by the NTSC carried-wave fv extraction circuit 7 to be output to the fv judgment circuit 8. A threshold for the NTSC carrier-wave fv component is set in the fv judgment circuit 8 so as to judge the difference between the modulated wave of NTSC analog broadcast and digital 8VSB broadcast, and thereby, a switching control signal SWC, which takes a value of either high or low only when the NTSC analog broadcast is selected, is produced to be outputted to the switching circuit 12. By this SWC signal, when the selected modulated wave is that of NTSC analog broadcast, the switch 12 applies the selected modulated wave to the analog video processing circuit 14 with automatically performing switching.

Figure 10:
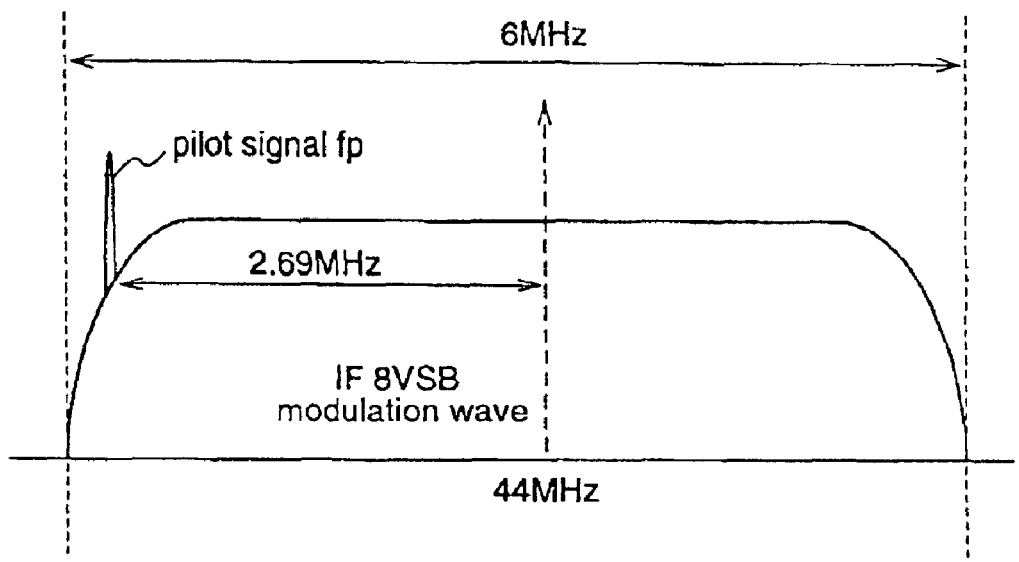
FIG. 10 is a diagram illustrating a modulation wave of digital VSB broadcast.
Figure 11:
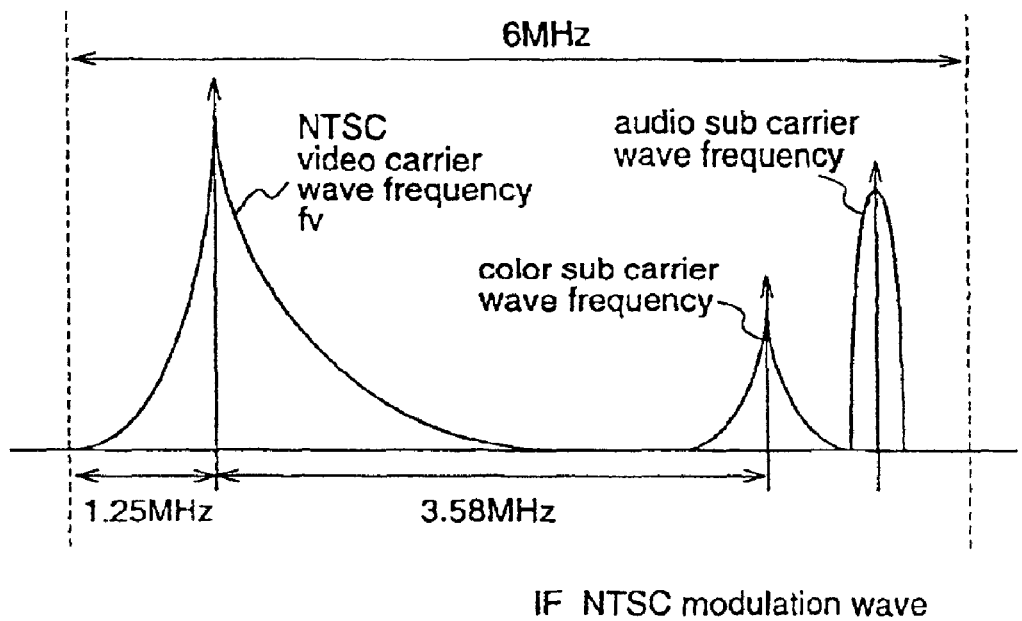
FIG. 11 is a diagram illustrating a modulation wave of NTSC analog broadcast.
Figure 12:
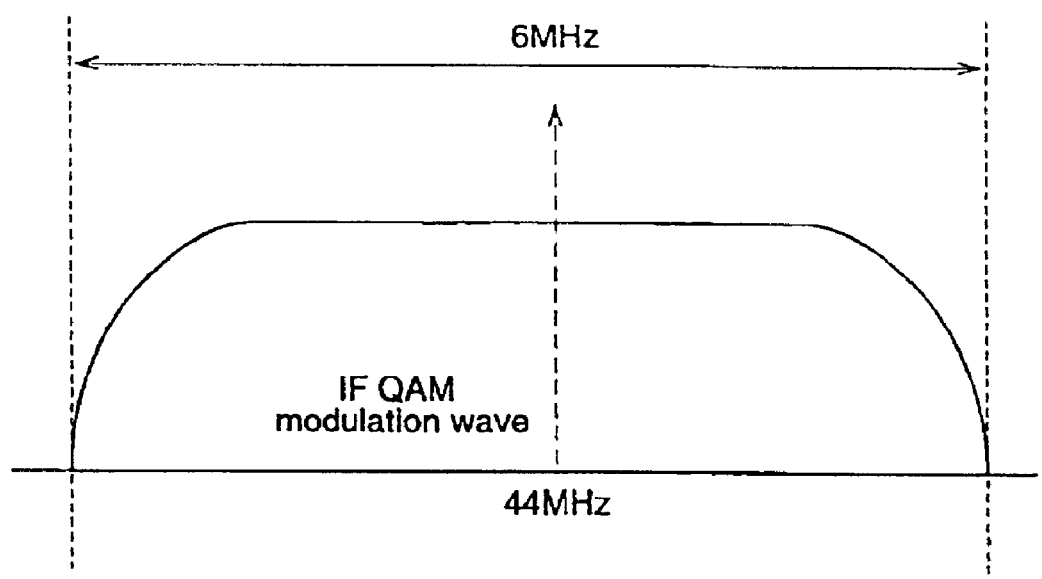
FIG. 12 is a diagram illustrating a modulation wave of digital QAM broadcast.

FIG. 10 and FIG. 11 show the modulation waves of NTSC analog broadcast and the modulation wave of digital 8VSB broadcast, respectively. The NTSC analog modulation shown in FIG. 10 places the carrier wave fv at the point of 1.25 MHz within 6 MHz of the channel band width as seen in FIG. 11, and is thus apparently different from the 8VSB digital modulation wave shown in FIG. 10, in the part of carrier wave frequency component. By this difference in frequency component, the fv judging circuit 8 can judge the type of broadcast accurately whether it is NTSC analog broadcast or digital 8VBS broadcast. Thereby, it is possible to instantaneously and automatically detect and judge accurately whether the type of broadcast is NTSC analog broadcast or digital 8VBS broadcast from the IF signal, which is selected by the tuner 2.

According to the first embodiment of the present invention, it is possible to provide a multi-system corresponding receiver, that is intended to receive analog NTSC broadcast and digital 8VSB broadcast, and which, at the reception thereof, can switch automatically to a demodulation circuit that is appropriate for receiving the broadcast.

Figure 2:
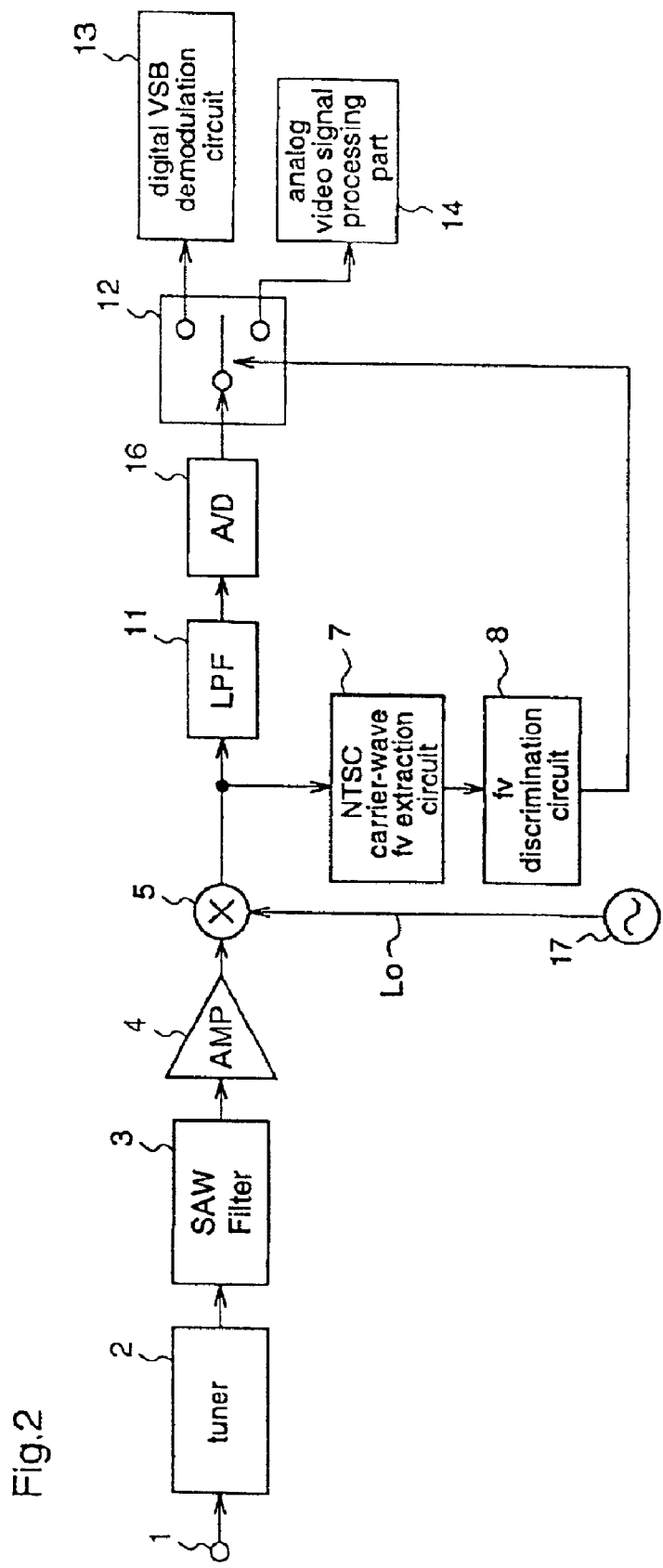
FIG. 2 is a block diagram illustrating the multi-modulation receiver as a modification of the first embodiment of the present invention.

FIG. 2 shows a modification of the multi-system corresponding receiver in the first embodiment of the present invention.

FIG. 2 shows a block diagram of a system for performing digital wave detection of the IF signal, which is selected by the tuner 2.

In the constitution shown in FIG. 2, an IF signal which was amplified by the AMP 4 is multiplied with a local signal Lo from the local oscillator 17, by the mixer 5 and then converted into a frequency band lower than that of the IF signal, with keeping being a modulation wave. The modulation wave converted to a low frequency band is input passing through the LPF 11, to the A/D converter 16. The signal converted from an analog signal to a digital signal by the A/D converter 16 is switched by the switch 12 and then supplied to a demodulation circuit appropriate for selected modulation system. The fv detection of NTSC carrier wave is performed by detecting, a NTSC carrier wave component with using the modulated wave which is converted into a frequency band lower than that of the IF signal to generate a switching control signal, which is outputted to the switching circuit 12. Therefore, it is possible to realize an operation that when the received broadcast wave is selected, the modulation system is instantaneously judged (discriminated), and switching to an appropriate demodulation circuit is performed.

As described above, according to the multi-system corresponding receiver as a modulation of the first embodiment of the present invention, it is possible to provide a multi-system corresponding receiver, which is intended to receive analog NTSC broadcast and digital 8VSB broadcast, which can switch automatically to a demodulation circuit appropriate for the received broadcast with using the modulation wave which is converted into a frequency lower than that of the IF signal, and is, therefore, quite user-friendly.

(Embodiment 2)

A second embodiment corresponding to claims 4 to 6 of the present invention will now be described with reference to FIG. 3.

Figure 3:
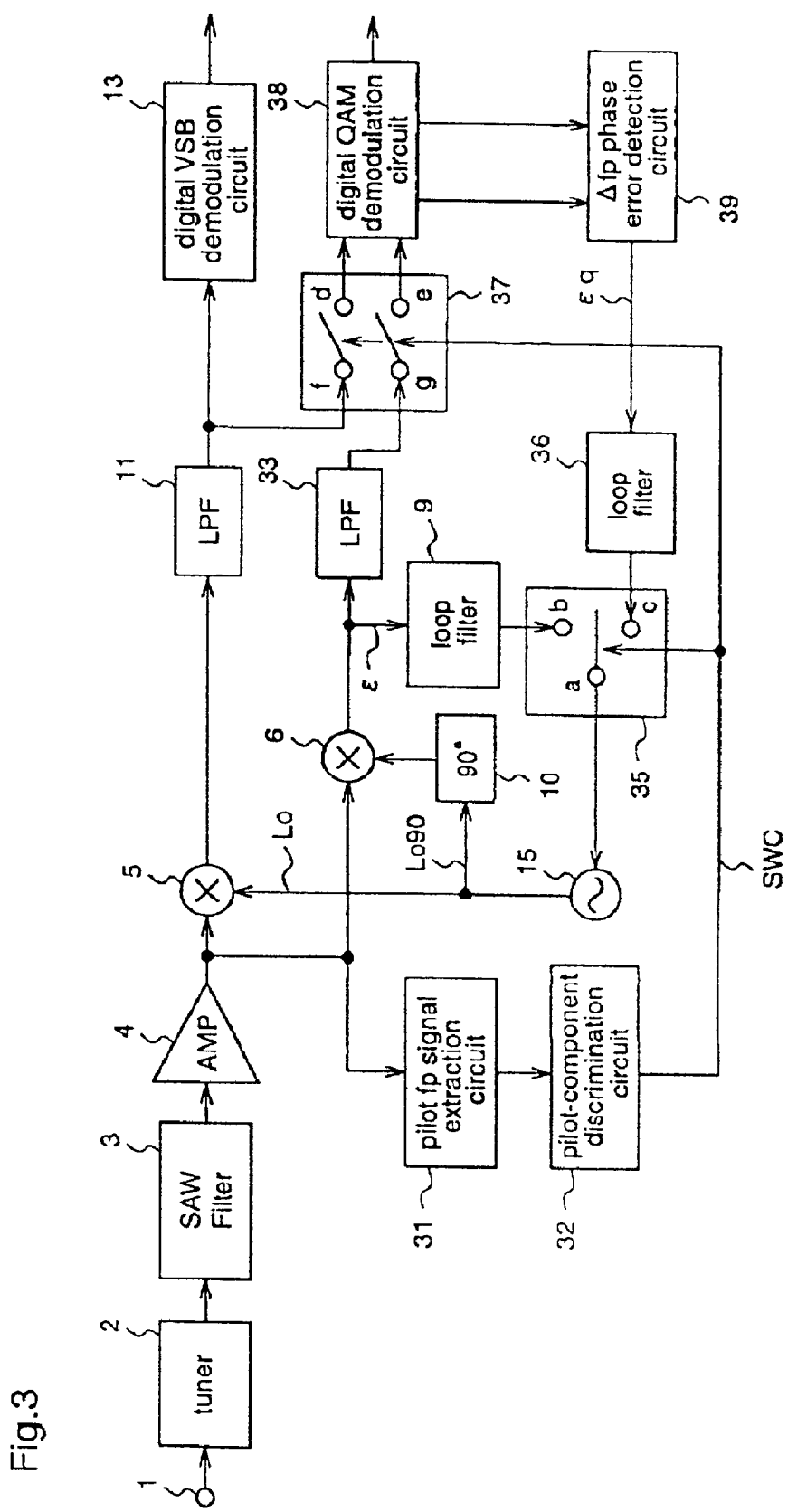
FIG. 3 is a block diagram illustrating the multi-modulation receiver in the second embodiment of the present invention.

FIG. 3 is a block diagram of a multi-system corresponding receiver which corresponds to both of digital QAM modulation system and digital 8VSB modulation system.

In the figure, there are provided a tuner 2 for selecting the channel of received digital modulation wave; a SAW filter 3 for applying a frequency band limitation to an IF signal at the tuner 2; an AMP 4 for amplifying the IF signal which is output from the SAW filter 3; mixers 5 and 6 for orthogonal wave detecting; a LPF 11 for applying a frequency limitation to the signal output from the mixer 5; a LPF 33 for applying a frequency limitation to the output signal from the mixer 6; a digital VSB demodulation circuit 13 for performing digital VSB demodulation; a QAM demodulation circuit 38 for performing digital QAM demodulation; a Δf detection phase error detection circuit 39 for detecting errors of frequency and phase to the carrier wave of QAM modulated wave; a loop filter 9 for applying a frequency imitation to the signal output from the mixer 6; a loop filter 36 for applying a frequency band limitation to the signal output from the Δf detection phase error detection circuit 39; a switching circuit 35 for switching the signals respectively output from the loop filters 9 and 36; a VCO 15 for outputting a signal whose oscillation frequency is controlled with using a signal output from the switching circuit 35 as a control signal; a 90° phase shifter 10 for shifting the phase of the output signal by 90°; a pilot fp signal extraction circuit 31 for extracting a pilot signal component of a digital 8VSB carrier wave in the IF signal; a pilot component detecting circuit 32 for detecting and discriminating a fp component; and a switching circuit 37 for switching either to a digital VSB demodulation circuit 13 or to a digital QAM demodulation circuit 38 in accordance with a control signal from the pilot component detecting circuit 32.

A description is given of an operation of the multi-system corresponding receiver for digital VSB broadcast and digital QAM broadcast, which is constituted as described above.

Digital QAM modulation systems are applied mostly in the field of cable broadcast with the use of multi-valued modulation of 64 QAM and 256 QAM. Cable TV is widely diffused in North America amounting to 65%, and a transition to CATV with digital QAM modulation system is gradually advancing. On the other hand, as ground wave digital broadcast, digital ground wave broadcast with 8VSB modulation system has started, in which it is planned to carry out transmission including digital 8VSB modulation wave as it is in digital CATV.

In the block construction shown in FIG. 3, the same reference numerals as in FIG. 1 showing the first embodiment denote the same elements.

The modulation wave, which was selected by the tuner 2 and subjected to frequency band limitation by the SAW filter 3, is amplified by the AMP 4 and then output to the pilot fp signal detection circuit 31. As illustrated in FIG. 10, the digital 8VSB modulation wave is overlaid with a carrier, called a pilot signal, in the frequency which is apart by 2.69 MHz from the center frequency of modulation wave. This pilot fp component is extracted by the pilot fp signal detection circuit 31 and then output to the pilot component detection circuit 32. The pilot component judging circuit 32 judges the presence of a pilot component with the use of a threshold value, and generates a switching control signal SWC on the basis of the result of the judgment thereby to supply the same to the switching circuits 35 and 37. When a pilot component was detected, it is judged that the received broadcast wave is a 8VSB modulated wave, and by a switching control signal SWC, the switching circuit 35 is made a state where b terminal is connected, and the switching circuit 37 is made a state where f terminal and g terminal are disconnected from d terminal and e terminal respectively. In this way, it is possible to automatically switch to the demodulation circuit 13 that is appropriate for the modulation system of 8VSB modulation wave, judging from the received broadcast wave. Similarly, for the loop filters 9 and 36, switching is automatically performed to the loop filter 9, that is appropriate for the received modulation wave.

On the other hand, when no pilot component was detected, the received broadcast wave is judged as a QAM digital modulation wave, and switching is performed such that the switching circuit 35 is made a state where connection is performed to c terminal and the switching circuit 37 is made a state where connections are performed to d and e terminals, respectively. Accordingly, it is possible to realize a switching to the demodulation circuit 38 that is appropriate for QAM modulation system.

An operation in case where digital QAM broadcast is received is as follows. The broadcast wave is selected by the tuner 2 and then output as an IF signal. The IF signal is subject to the frequency band limitation by the SAW filter 3, amplified by the AMP 4, and output to the mixers 5 and 6. Because the QAM modulated wave includes orthogonal components of I and Q signals, it is multiplied by a local signal Lo output from the VCO 15 by the mixer 5, and the obtained base-band I signal is output. Meanwhile, the Lo 90 signal, which is obtained by the operation that the 90° phase shifter 10 shifts the phase of a local signal from the VOC 15 by 90°, is input to the mixer 6 to be multiplied by the modulated wave, thereby to output the orthogonal component base-band Q signal. I and Q signals pass through the LPFs 11 and 33 respectively to be subjected to cutting of high frequency components, switched at the switching circuit 37, and output to the QAM demodulation circuit 38. Subsequently, the I and Q signals input to the QAM demodulation circuit 38 are supplied to the Δf detection-phase error detection circuit 39. The Δf detection-phase error detection circuit 39 detects a frequency error component of the carrier wave of QAM modulation wave, and outputs it as a frequency error εq to the loop filter 36.

The loop filter 36 applies a frequency band limitation to the frequency error εq and the frequency band limited signal is supplied through the switch circuit 35 to the VCO 15 as a frequency control signal. A PLL is constructed by a closed loop including the loop filter 36 and the VCO to carry out a feedback control, and detection processing synchronized with the carrier wave of the input QAM modulation wave is carried out by the mixers 5 and 6. The base-band I and Q signals that are synchronous detected, are demodulated by the QAM demodulation circuit 38.

According to the second embodiment of the present invention, it is possible to provide a multi-system corresponding receiver, which is intended for digital 8VSB broadcast and digital QAM broadcast, which, at the reception thereof, can switch automatically to a demodulation circuit that is appropriate for receiving the broadcast, and is, therefore, quite user-friendly.

Figure 4:
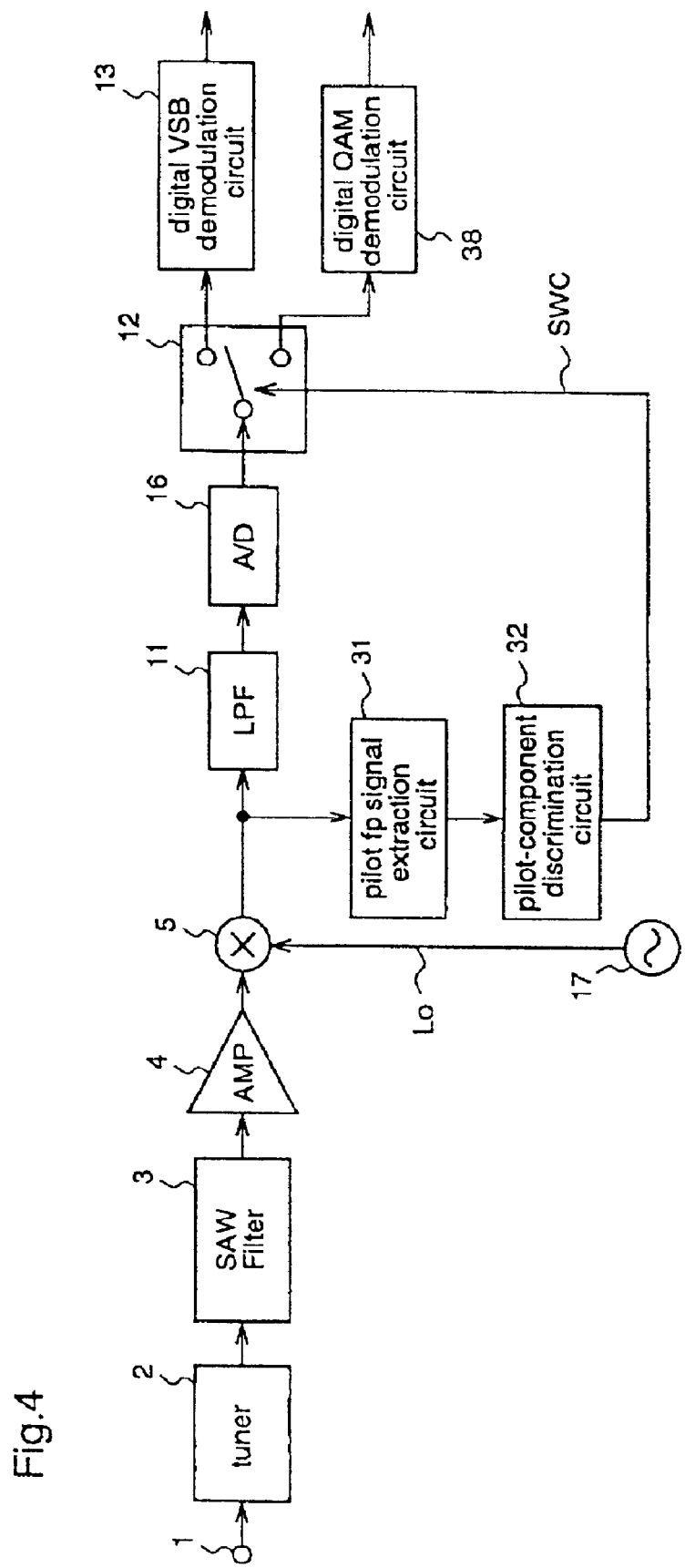
FIG. 4 is a block diagram illustrating the multi-modulation receiver as a modification of the second embodiment of the present invention.

FIG. 4 shows a modification of the second embodiment.

FIG. 4 shows a block diagram illustrating a system of digitally detecting the IF signal which is selected by the tuner 2. The blocks with the same reference numerals denote the same elements as those shown in FIG. 3.

In the constitution shown in FIG. 4, an IF signal which was amplified by the AMP 4 is multiplied by the mixer 5 with a local signal Lo which is output from the local oscillator 17, to be down converted into a frequency band lower than that of the IF signal, with keeping being a modulation wave. The down converted modulated wave is input to the A/D converter 16 passing through the LPF 11 for cutting the high frequency components. The signal which is converted from an analog signal to a digital signal by the A/D converter 16 is switched by the switch 12 to be supplied to a demodulation circuit appropriate for selected modulation system. With respect to the detection of the 8VSB pilot component fp, it is detected and judged similarly as in FIG. 3 using the modulation wave that is frequency converted to a further lower frequency than the that of the IF frequency, thereby to generate a switching control signal SWC to be supplied to the switch circuit 12. In this way, it is possible to realize that after the received broadcast is channel selected, the modulation system is instantaneously judged and switching isa performed to a demodulation circuit appropriate for the selected modulation system.

As described above, according to the modification of the second embodiment of the present invention, it is possible to provide a multi-system corresponding receiver, which is intended to receive digital 8VSB broadcast and digital QAM broadcast, which, at the reception thereof, can switch automatically to a demodulation circuit appropriate for the received broadcast using the modulation wave which is converted into a frequency further lower than that of the IF signal, and is, therefore, quite user-friendly.

(Embodiment 3)

A third embodiment corresponding to claims 7 to 9 of the present invention will now be explained with reference to FIG. 5.

Figure 5:
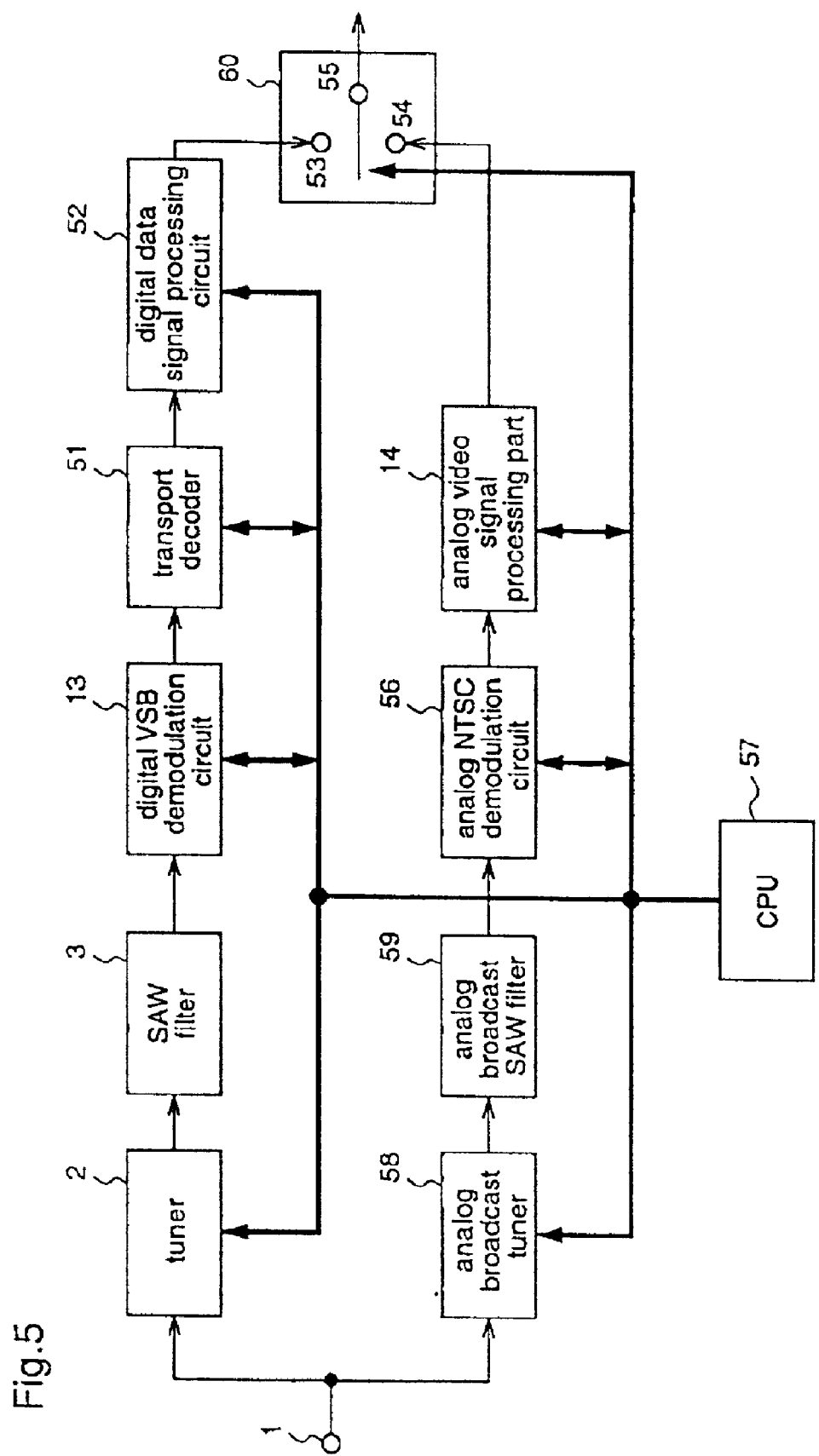
FIG. 5 is a block diagram illustrating the multi-system corresponding receiver in the third embodiment of the present invention.

FIG. 5 is a block diagram of a multi-system corresponding receiver which corresponds to both of digital 8VSB broadcast and NTSC analog broadcast. That is, there are provided two tuners for analog broadcast and digital broadcast, respectively, and a single CPU 57 which controls the whole system.

In the figure, there are provided a tuner 2 for selecting the channel of received digital modulation wave; a SAW filter 3 for applying a frequency band limitation to the IF signal at the tuner 2; a digital VSB demodulation circuit 13 for performing digital VSB demodulation for the signal output from the SAW filter 3; a TS decoder for decoding a transport data; a digital decoding and signal processing circuit 52 for decoding and video processing the digital data; a terminal 53 for outputting a digitally decoded video signal; a tuner 58 for channel selecting the analog broadcast; a SAW filter 59 for applying a frequency band limitation to the IF signal from the tuner 58; an analog NTSC demodulation circuit 56 for performing detection of NTSC modulation wave; an analog video signal processing circuit 14 for performing analog video signal processing; an analog video signal output terminal 54; a CPU 57 for controlling the whole system; and a switching circuit 60 for switching video signals of digital and analog broadcasts from each other.

A description is given of a multi-system corresponding receiver for digital VSB broadcast and analog broadcast, which is constructed as above.

In the block construction shown in FIG. 5, the blocks with the same reference numerals denote the same elements as those in the first embodiment.

In case of receiving digital 8 VSB broadcast, a digital modulation wave is demodulated by the digital VSB demodulation circuit 13 to be output as a transport data to the TS decoder 51. A video data is extracted from the transport data by the TS decoder 51 to be output to the digital decoding circuit 52. The video data which is obtained by MPEG decoding by the digital decoding circuit 52 is output as analog video signal to the terminal 53. The channel selection and the control operation in the respective digital processing circuits are performed by the CPU 57.

When receiving analog broadcast, channel selection is performed by the CPU 57 controlling the analog broadcast tuner 58. The IF signal output from the tuner 58 is subjected to a frequency band limitation by the SAW filter 59 to be output to the analog NTSC demodulation circuit 56. The orthogonal detection is performed by the analog NTSC demodulation circuit 56, and thereby the modulated wave is converted into a base-band video signal. The signal converted to the base-band video signal is input to the analog video signal processing circuit 14 thereby to be subjected to analog vide processing, and the result is output as an analog video signal to the output terminal 54.

In digital 8VBS ground wave broadcast in North America, considerably many programs of digital broadcast are obligated to be co-broadcast together with NTSC analog broadcast during a transition period until digital broadcast is widely diffused. Accordingly, each broadcasting station performs analog broadcasting concurrently with the digital broadcasting, for the same programs which are broadcast in digital broadcast. In that case, programs and time tables of the analog broadcast are transmitted together with the video data, included in the transmission data of digital broadcast, thereby enabling the user's confirmation by such as an EPG (Electric Program Guide).

Figure 6:
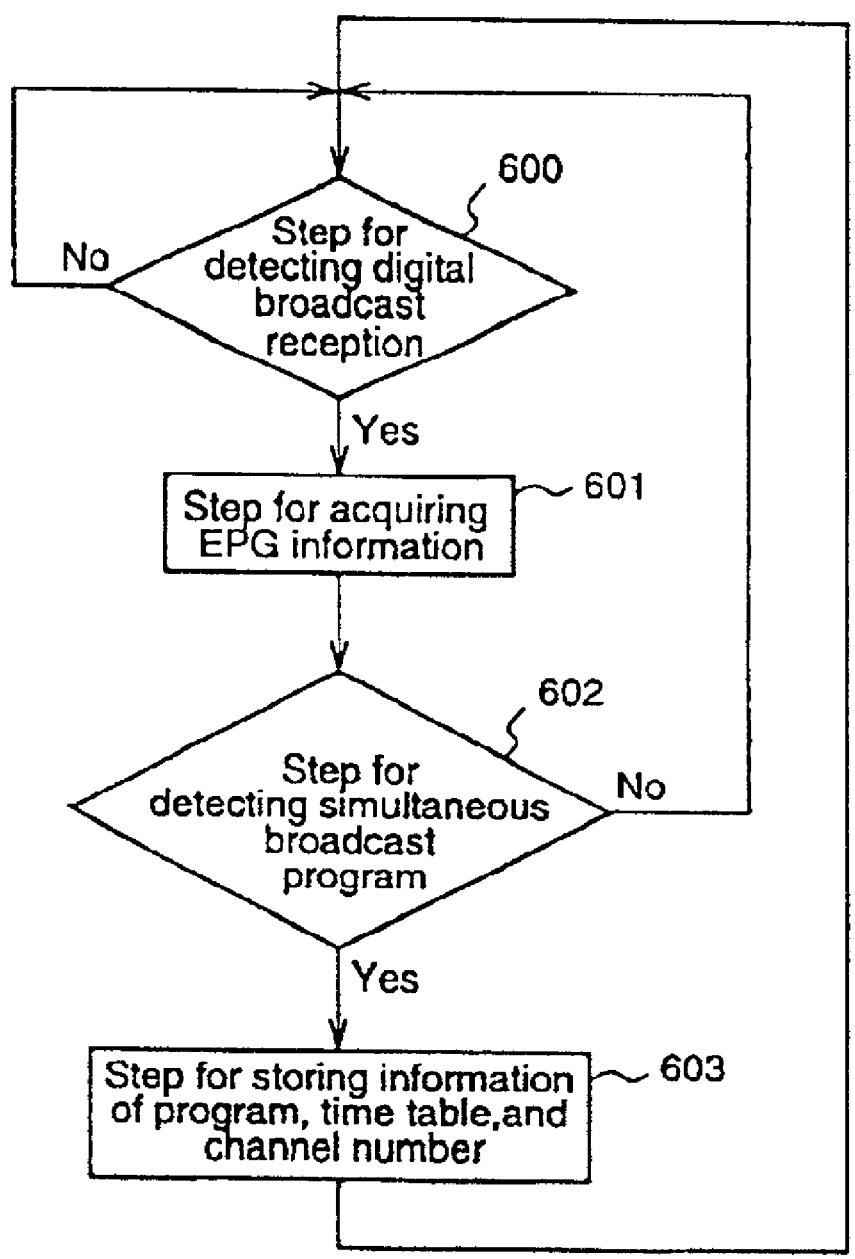
FIG. 6 is a flowchart illustrating the acquisition of EPG information, which relates to the third to fifth embodiments of the present invention.

When analog and digital broadcast programs are seamlessly selected employing two tuners by the same CPU, digital broadcast requires a relatively long time for digital demodulation and digital decoding as compared with analog broadcast and it takes a long time from the channel selection to the video display. Here, an operation of seamlessly performing a high-speed channel search for analog and digital broadcasting by users employing a remote controller will now be described. FIG. 6 shows a flowchart of the control operation by the CPU 57 for acquiring channel numbers and program tables from the simultaneous broadcasting of the analog and digital broadcasts.

When digital broadcast is selected, it transits to step 600. When digital broadcast program is channel selected at step 600, an EPG information which is transmitted with audio and video data is acquired at step 601, and it transits to step 602. An investigation of channel numbers and time tables of simultaneous programs of analog and digital broadcasts is performed at step 602, and when there is no simultaneous program, it returns to the first step 600 and continues to monitor the EPG which is successively transmitted. When it is judged that there exists an analog simultaneous broadcast program from the EPG information transmitted in the digital broadcasting at step 602, it proceeds to step 603 and memorizes the program name, channel number, and time table of the simultaneous broadcasting program into an information table. By regularly repeating this operation, the content of the information table is always renewed to the latest EPG information.

Figure 7:
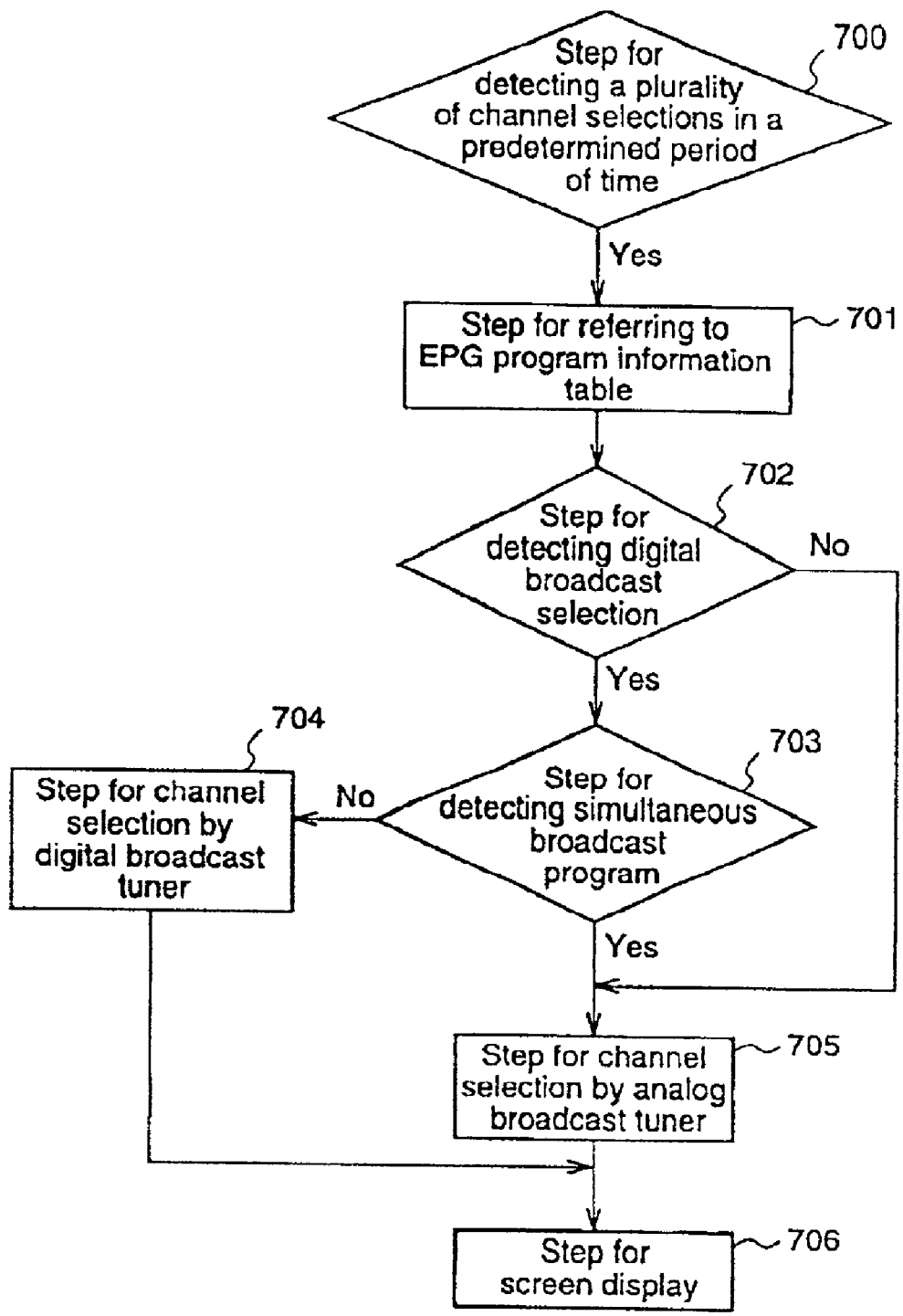
FIG. 7 is a flowchart illustrating the operation steps in the third embodiment of the present invention.

FIG. 7 shows a flowchart of the control operation by the CPU 57 when performing a high speed channel search.

When performing a seamless channel up down operation of the analog and digital broadcasts by such as a remote controller, it enters step 700. When it is judged that a channel up down command was transmitted within a predetermined period of time for judgement, it proceeds to step 701. At step 701, an information table having acquired the EPG information is referred to, and then it proceeds to step 702. When the currently selected channel under a high-speed search is not that of digital broadcast at step 702, it jumps to step 705, to carry out a channel selection by the analog tuner, and it further proceeds to step 706. When the current channel which is selected by a high speed search at step 702 is the digital broadcast, it proceeds to step 703 to investigate whether there is an analog simultaneous broadcast in the currently selected channel. When there is no analog simultaneous program, it proceeds to step 704 and the digital broadcast tuner is selected. When there is any analog simultaneous program, it enters step 705, to select the analog broadcast tuner, and further, proceeds to step 706 to carry out a screen display.

When the analog broadcast program and the digital broadcast program are under a seamless high speed channel search within a predetermined period of time, even when the present channel under a high speed channel is a digital broadcast program, if there is an analog simultaneous program, it is switched to an analog broadcast to carry out an analog channel selection, and when the user carries out a channel up down seamlessly at a high speed to watch the contents of programs on a screen, even when a digital broadcast channel is selected, it is possible to carry out a screen display of a program content instantaneously and it is possible to carry out a high speed channel search with no uncomfortable feeling by such as a remote controller.

As described above, according to the multi-system corresponding receiver of this third embodiment, it is possible to provide the program contents to users by conducting quick screen changes without uncomfortable feeling, even when the analog broadcast programs and digital broadcast programs are high speed channel changed.

Embodiment 4

A fourth embodiment corresponding to claims 10 to 12 of the present invention will now be described with reference to FIG. 8.

Figure 8:
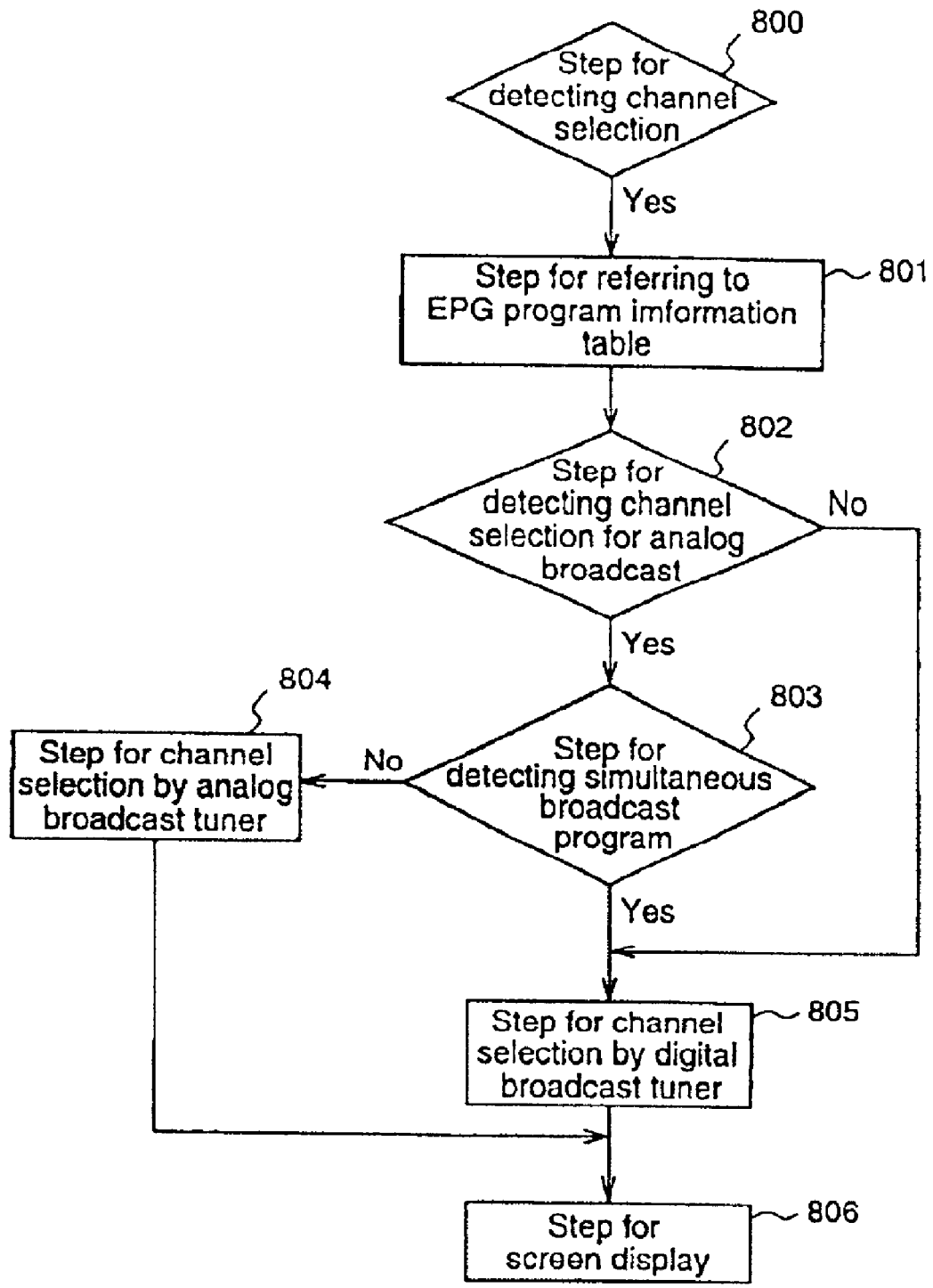
FIG. 8 is a flowchart illustrating the operation steps in the fourth embodiment of the present invention.
Figure 9:
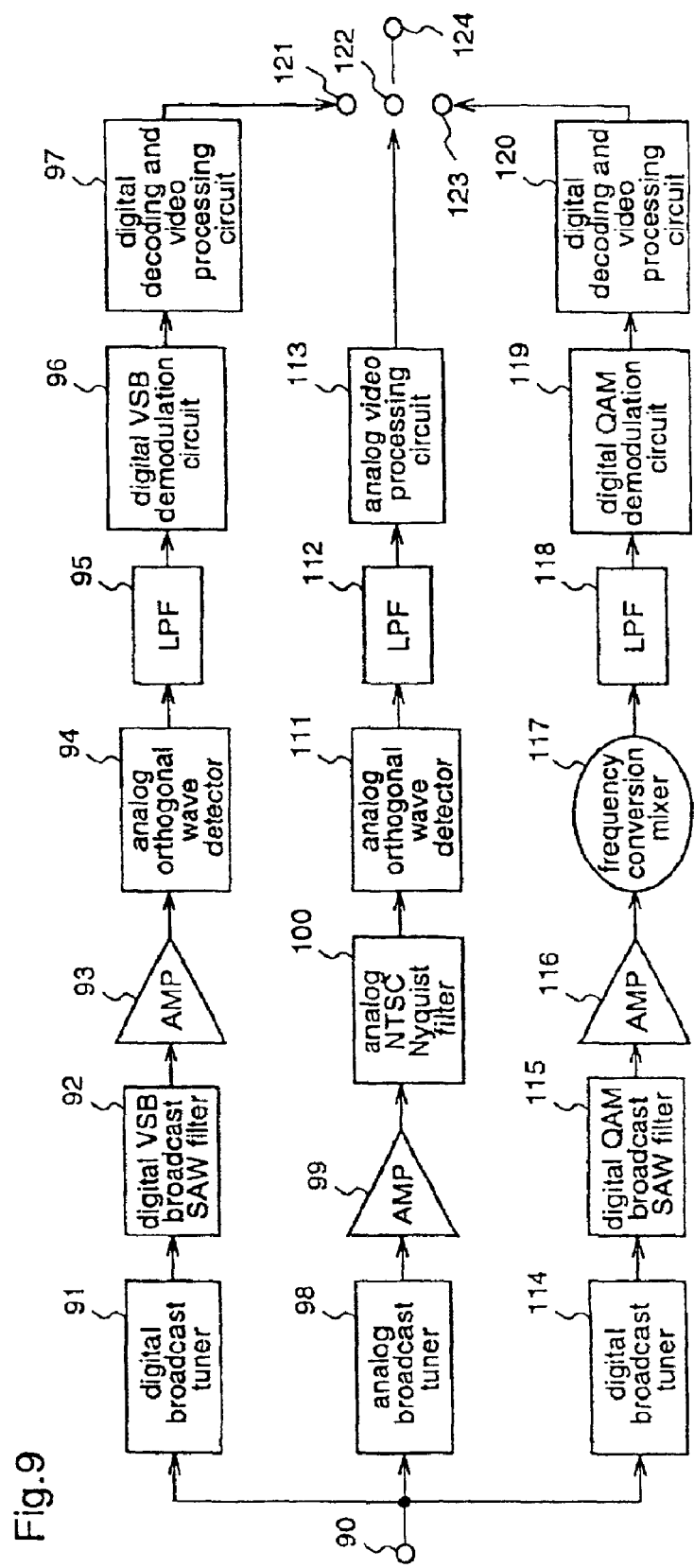
FIG. 9 is a block diagram illustrating a conventional multi-system corresponding receiver.

FIG. 8 illustrates the steps of control operation by the CPU 57 in this fourth embodiment.

In the block construction of a multi-system corresponding receiver in this fourth embodiment, the blocks with the same reference numerals denote the same elements as those shown in the third embodiment.

At the time of channel selection, particularly, when analog and digital broadcasts are seamlessly selected under control of a single CPU 57, it enters step 800. Similarly as described in the third embodiment referring to FIG. 6, the acquired and memorized EPG information is referred to at step 801. Then, it proceeds to step 802, thereby to check whether or not the selected channel is of analog broadcast. When it is digital broadcast, it jumps to step 805, to perform selection of digital broadcast.

When the selected channel is that of analog broadcast, it proceeds to step 803, to investigate whether the broadcast is provided as simultaneous broadcasting of analog and digital broadcast, and if not, it proceeds to step 804, to select analog broadcast, and to carry out a screen display thereof.

On the other hand, when there is digital broadcast as simultaneous broadcast of the analog broadcast, it jumps to step 805 to switch to digital broadcast, and further proceeds to step 806, thereby to perform a screen display of the digital broadcast program, which is a simultaneous broadcast of the analog broadcast.

From the above operation, when performing a seamless reception of mixed analog and digital broadcasts, when there is a simultaneous broadcast when analog broadcast is selected, it is automatically switched to digital broadcast, which is better in video quality as compared with analog broadcast, and thereby to carry out a screen display. Although the above description is carried out for a system having a construction in which two tuners, one for analog broadcast and the other for digital broadcast, are provided for receiving, it is apparent that same operation can be performed by a single tuner for receiving the both analog and digital broadcasts.

As described above, according to the multi-system corresponding receiver in this fourth embodiment, even when analog broadcast is previously selected, if the selected program is one of simultaneous broadcast of analog and digital broadcasts, it is automatically switched to digital broadcast to be displayed, which is better in video quality.

(Embodiment 5)

A fifth embodiment corresponding to claims 13 to 15 of the present invention will now be described with reference to FIG. 13.

Figure 13:
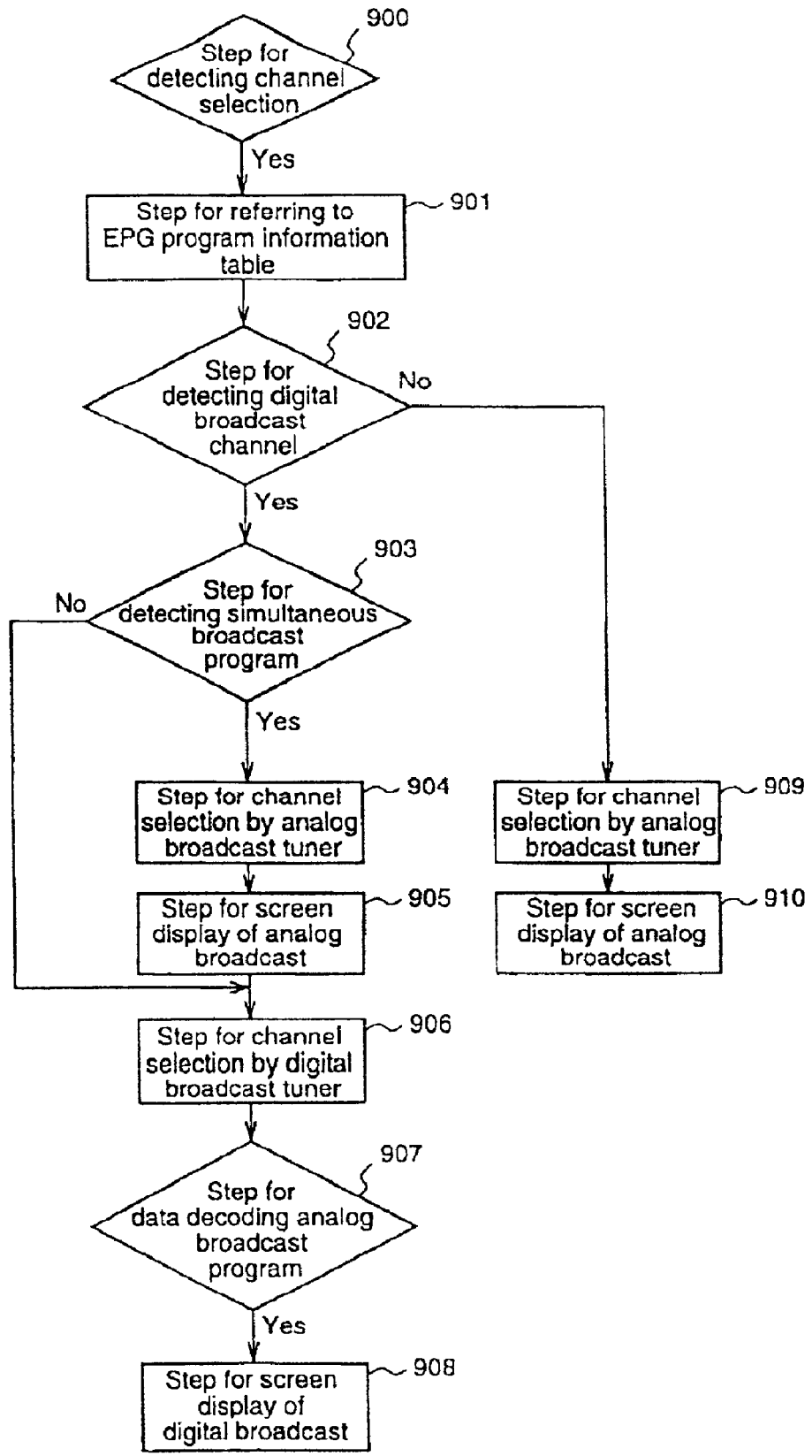
FIG. 13 is a flowchart illustrating the operation steps in the fifth embodiment of the present invention.

FIG. 13 illustrates the steps of control operation by the CPU 57 in this fifth embodiment.

In the block construction, the blocks with the same reference numerals denote the same elements as those in the third embodiment shown in FIG. 5.

When channel selection is performed in a receiver which seamlessly selects analog and digital broadcasts under a control by a single CPU 57, it proceeds to step 900. Subsequently, as described in the third embodiment referring to FIG. 6, it proceeds to step 901, thereby to refer to the acquired and memorized EPG information. After investigating channel numbers and time tables of the simultaneous broadcastings of analog and digital broadcast, it proceeds to step 902. At step 902, it is judged whether the selected channel program is that of digital broadcast or not, and if it is judged not the digital broadcast, it jumps to step 909 to select analog broadcast tuner and proceeds to step 910, to display the analog broadcast program on a screen. On the other hand, when the selected channel is that of digital broadcast, it proceeds to step 903, to judge whether it is the simultaneous broadcasting of the analog broadcast. When there exists the simultaneous broadcasting, it proceeds to step 904 to select the simultaneously on-air analog broadcast program, and it further proceeds to step 905 to perform a screen display. Subsequently, it proceeds to step 906 to perform a channel selection of digital broadcast program by a digital broadcast tuner while displaying the analog broadcast program on a screen, and it proceeds to step 907. At step 907, it is detected whether MPEG decoding of the digital broadcast program has been completed. For the signal detecting that MPEG decoding has been completed, PTS data in data stream is employed, and when the PTS is detected by the CPU 57, the PTS data is set and when the set value and the transmitted data matches with each other, it proceeds to step 908, to switch from the analog broadcast program which has been displayed, to a screen display of the digital broadcast program. The PTS signal is a control signal representing the administration information of playback outputting time which is provided in MPEG2 standard.

From this operation, when a digital broadcast program is selected, while the broadcast wave of the mixed analog and digital broadcasting is seamlessly received, it is judged whether the digital broadcasting program is the simultaneous broadcasting of the analog broadcasting with the help of the previously acquired and memorized EPG information. If it is the simultaneous broadcasting, analog broadcast program is selected with priority. Because analog broadcast is very fast from channel selection to screen display as compared with digital broadcast, the selected program can be first provided to users for screen display prior to the digital broadcast. Further the channel selection for digital broadcast program is performed by a digital broadcast tuner while performing a screen display of the analog broadcast program, and at the time when completion of data decoding is detected, screen display of the program is switched from analog broadcast to digital broadcast, thereby, realizing seamless receiving of analog and digital broadcasts and screen switching without uncomfortable feeling to users.

As described above, according to the multi-system corresponding receiver in the fifth embodiment, it is possible, at the time of switching from analog broadcast to digital broadcast, to switch the screen smoothly by keeping display of analog broadcast program on the screen, until decoding of digital broadcast program is completed.

What is claimed is:

1. A multi-system correspondence receiver for the terrestrial broadcasting including mixed digital modulated wave broadcasting for transmitting in packets coded digital video and audio data and NTSC analog modulated wave broadcasting, comprising:

an intermediate frequency converting means for selecting the channel of the broadcast wave and converting the selected high frequency signal into an IF signal having a center frequency of 44 MHz;

a modulated wave converting means for, when the intermediate frequency signal is applied, converting digital and analog modulated waves into base-band signals, respectively;

a carrier wave component extracting means for extracting a carrier wave component of an analog NTSC modulated wave from the IF signal; and a modulated wave discrimination means for judging whether the received signal is the analogue modulation wave or the digital modulation wave from the extracted carrier wave component.

2. A multi-system correspondence receiver as defined in claim 1, further comprising:

a frequency conversion means for converting the selected IF signal into a further lower band; and a carrier wave component detecting means for detecting a carrier wave component of the analog modulation wave signal in the digital and analog modulated waves which are frequency converted into the further lower band.

3. A multi-system correspondence receiver as defined in claim 1, further comprising:

an analogue NTSC modulation wave demodulator circuit for demodulating the analogue NTSC modulated wave;

a digital modulation wave demodulation circuit for demodulating the digital demodulated wave; and a demodulation signal processing circuit being switched dependent on the judgment result of whether the extracted carrier component is the analogue modulation wave or the digital modulation wave.

* * * * *